United States Patent
Loehndorf et al.

(10) Patent No.: US 8,098,476 B2
(45) Date of Patent: Jan. 17, 2012

(54) FLUIDIC ELECTROSTATIC ENERGY HARVESTER

(75) Inventors: Markus Loehndorf, Munich (DE); Terje Kvisteroey, Horten (NO); Horst Theuss, Wenzenbach (DE); Bjoern Blixhaven, Tonsberg (NO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/881,248

(22) Filed: Sep. 14, 2010

(65) Prior Publication Data

US 2011/0001493 A1    Jan. 6, 2011

Related U.S. Application Data

(63) Continuation of application No. 11/858,474, filed on Sep. 20, 2007, now Pat. No. 7,872,851.

(51) Int. Cl.
*H01G 5/04* (2006.01)
*H01G 5/01* (2006.01)
*H01G 7/00* (2006.01)
*H01G 5/012* (2006.01)
*H01G 5/013* (2006.01)

(52) U.S. Cl. ........ 361/292; 361/278; 361/280; 361/284; 361/285

(58) Field of Classification Search .......... 361/278, 361/280, 284, 285, 292
See application file for complete search history.

(56) References Cited

U.S. PATENT DOCUMENTS

| | | | |
|---|---|---|---|
| 3,154,699 A * | 10/1964 | Courtney-Pratt | 307/108 |
| 3,218,526 A | 11/1965 | Tuttle | |
| 3,395,581 A * | 8/1968 | Spipin | 73/753 |
| 3,610,970 A | 10/1971 | Skinner | |
| 4,054,826 A | 10/1977 | Wahlstrom | |
| 4,126,822 A * | 11/1978 | Wahlstrom | 322/2 A |
| 4,624,140 A | 11/1986 | Ekchian | |
| 5,092,171 A | 3/1992 | Wallrafen | |
| 6,275,681 B1 * | 8/2001 | Vega et al. | 455/41.1 |
| 6,879,809 B1 * | 4/2005 | Vega et al. | 455/41.1 |
| 7,088,567 B2 * | 8/2006 | Hunt et al. | 361/277 |
| 7,439,630 B2 * | 10/2008 | Peacock | 290/1 R |
| 7,872,851 B2 * | 1/2011 | Lohndorf et al. | 361/292 |
| 2004/0253123 A1 | 12/2004 | Xie et al. | |
| 2008/0089005 A1 | 4/2008 | Choi et al. | |

OTHER PUBLICATIONS

Notice of Allowances issued on Sep. 20, 2010 to U.S. Appl. No. 11/858,474.
Office Action dated Aug. 27, 2010 issued to U.S. Appl. No. 11/858,474.
Office Action dated Mar. 3, 2010 issued to U.S. Appl. No. 11/858,474.

* cited by examiner

Primary Examiner — Thomas Dougherty
(74) Attorney, Agent, or Firm — Eschweiler & Associates, LLC

(57) ABSTRACT

One embodiment of the present invention relates to a variable capacitor that operates without moving mechanical parts. In this capacitor electrically conductive electrodes are separated by an enclosed chamber filled with an electrically conductive material. The electrically conductive material can freely vary its position within the chamber. The capacitance of the device will vary as position of the conductive material changes due to external mechanical motion (ex: rotation, vibration, etc.) of the device. Other embodiments of this device are also disclosed.

11 Claims, 8 Drawing Sheets

$C = \tfrac{1}{2}\,\varepsilon_{eff}\,A/d_{eff}$

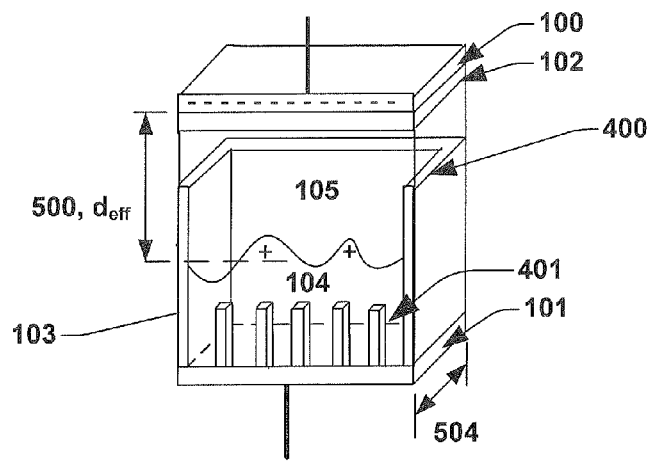
FIG. 5A
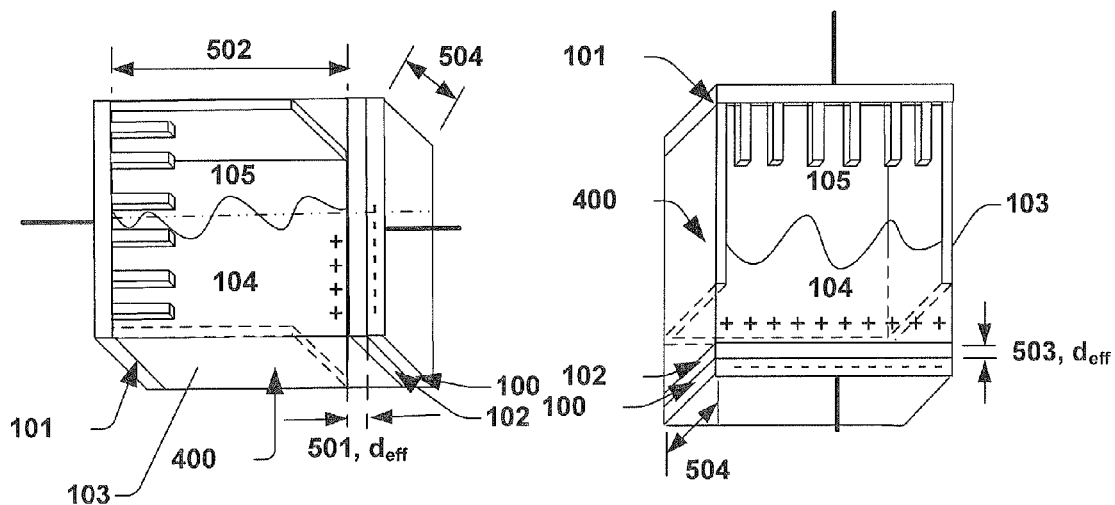
FIG. 5B  FIG. 5C

FLUIDIC ELECTROSTATIC ENERGY HARVESTER

CROSS REFERENCE TO RELATED APPLICATIONS

This application is a continuation of U.S. patent application Ser. No. 11/858,474 filed on Sep. 20, 2007, the contents of which are herein incorporated by reference in their entirety.

FIELD OF INVENTION

The present invention relates generally to a variable capacitor intended for use within an energy harvesting system. The energy harvesting system can further be used to power a tire sensor system in one embodiment.

BACKGROUND OF THE INVENTION

Energy harvesting is a process of taking energy from a chaotic system and converting it to a form of energy that can either be stored or used in a controlled manner. Energy harvesting is well known in forms such as hydroelectric turbines, solar cells, wind turbines, and other similar systems that have gained wide public exposure. These large systems harvest relatively large amounts of energy. Recently, science has begun to look for smaller energy harvesting systems. As the power requirements of small electronic devices have decreased, attempts have been made to harvest energy on a smaller scale and use that energy to power the devices.

Many of these micro energy harvesting systems exploit mechanical energy and are based around MEMS or micromachined fabricated capacitor electrodes. The initial charging of the capacitor is provided by using an external voltage supply or an electret material, a material which has a built in electric field (i.e. the analogue of a permanent magnet). The means used to subsequently change the capacitance and harvest energy varies among systems. For example, in the case of inertial energy harvesters, mechanical motion of the system moves a mass such that the inertia of the mass is harvested and used to increase the capacitance of the system.

There are two main problems associated with these devices. First, these movable mechanical parts are known to be a major source of failure in these devices due to crack formation, beam break, sticking or other mechanical problems caused by the stress. Second, due to existing infrastructure, the MEMS are often fabricated in silicon therefore causing an inertial mass system to be limited in efficiency by the density of silicon.

SUMMARY OF THE INVENTION

The following presents a simplified summary in order to provide a basic understanding of one or more aspects of the invention. This summary presents one or more concepts of the invention in a simplified form as a prelude to the more detailed description that is presented later and is not an extensive overview of the invention. In this regard, the summary is not intended to identify key or critical elements of the invention, nor does the summary delineate the scope of the invention.

One embodiment of the present invention relates to a variable capacitor, where an enclosed chamber and an insulating layer separate the electrodes of the capacitor. Within the enclosed chamber is a conductive material that can move freely within the enclosed chamber as the device undergoes changes in its orientation and/or position. So long as the conductive material is in contact with one of the electrodes a conductive path is created between the electrode and the conductive material, therefore essentially changing the size of the contacting electrode as the conductive material moves within the enclosed chamber. As the size of the electrode changes, the distance between electrodes of the variable capacitor changes and the capacitance changes. Other embodiments of the device and methods are also disclosed.

The following description and annexed drawings set forth in detail certain illustrative aspects and implementations of the invention. These are indicative of only a few of the various ways in which the principles of the invention may be employed.

BRIEF DESCRIPTION OF THE DRAWINGS

FIG. 5A-5C shows a sequence corresponding to the rotation of the capacitor of FIG. 3B;

DETAILED DESCRIPTION OF THE INVENTION

Figure 1A:
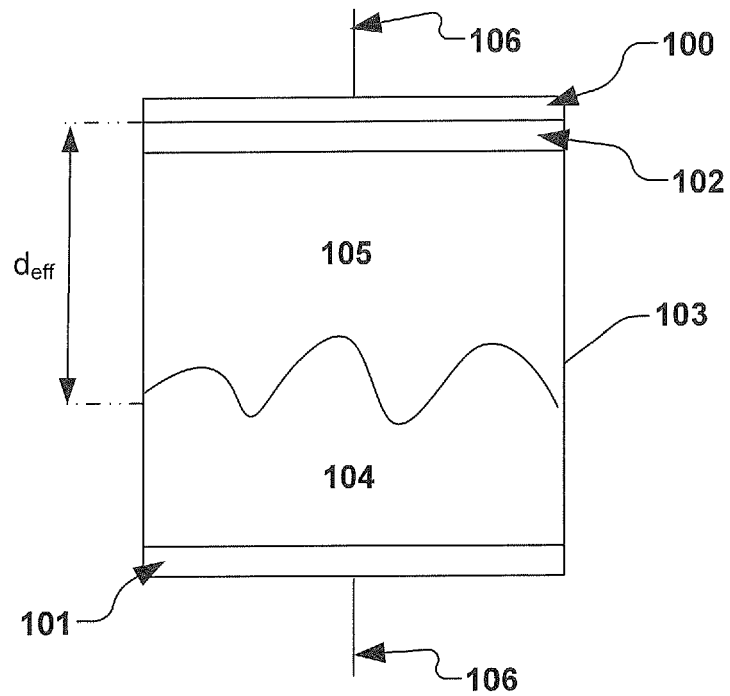
FIG. 1A shows the basic structure of an embodiment of the disclosed variable capacitor.

The present invention will now be described with reference to the attached drawing figures, wherein like reference numerals are used to refer to like elements throughout, and wherein the illustrated structures and devices are not necessarily drawn to scale.

Referring now to FIG. 1A, the basic structure of the variable capacitor comprises two electrodes 100 and 101, separated by an insulating layer 102 and an enclosed chamber 103. The enclosed chamber can be fabricated of various materials and of differing size according to various embodiments. Within the enclosed chamber 103 is contained a conductive material that can change its position freely when a force is applied thereto (e.g., gravity, acceleration, centrifugal motion, etc.). In one embodiment, the force applied to the conductive material will result in a change of position or orientation of the variable capacitor. The conductive material, for example, in one embodiment could be a combination of fluid 104 and gas 105, so long as the fluid is conductive (e.g., fluid metal, ionic solutions, fluids highly doped with metallic particles, etc.) and the gas allows the fluid to move freely within the enclosed chamber. Through use of different conductive materials with varying dielectric constants, different amounts of conductive material, and different chamber sizes, the minimum and maximum capacitance values of the device can be adjusted. For the purpose of the figures and description in this disclosure the conductive material will refer to a conductive fluid and gas mixture, but the invention is in no way limited to these materials. In one embodiment, the insulating layer 102 keeps the electrodes of the device from electrically shorting together. The insulating layer can be placed at any distance between the electrodes in various embodiments. It can be placed abutting an electrode or in the middle of the enclosed chamber so long as no conductive path is formed between the two electrodes. The device of FIG. 1A also has external conductive connections 106 on the outside of the conductive electrodes to facilitate connection to external circuits.

In another embodiment of the disclosed invention an additional electrode can be added to the device. In such an embodiment the normal of the additional electrode would be perpendicular to the existing electrodes. An additional enclosed chamber comprising a conductive fluid could also be placed between the additional electrode and the existing electrodes. The inventors have contemplated the addition of multiple electrodes and enclosed chambers to the variable capacitor device in this manner.

Figure 2A:
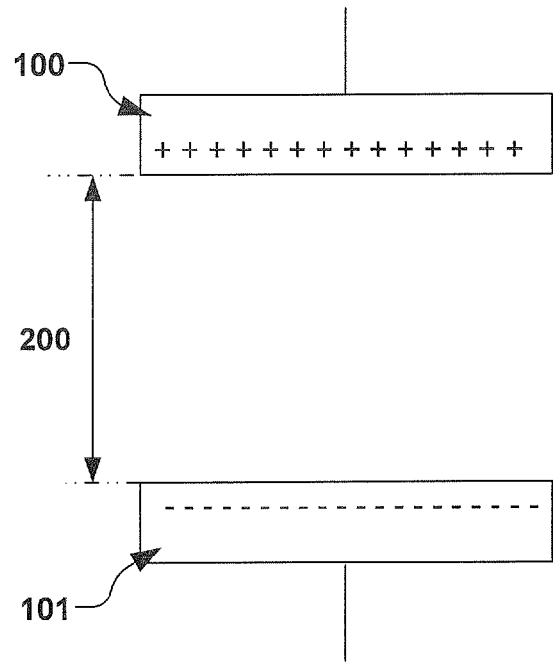
FIG. 2A shows the electrodes of a parallel plate capacitor at a fixed distance with charges included.

The basic operation of this device is based upon electrodynamics principles that can be understood by considering a parallel plate capacitor as shown in FIG. 2A comprising two electrodes 100 and 101 spaced apart at a fixed distance 200. Each electrode of this capacitor initially contains an uneven number of positive and negative charges on them. As the amount of positive and negative charge is different, each electrode will have an overall charge of either a positive or a negative value. Due to its overall charge, each electrode will contribute to an electric field and since charges in an electric field have a potential energy due to their position, the system contains a certain amount of energy due to the position of the charges relative to each other. The energy of the system will increase as the charges get closer to each other and their potential energy increases. The difference in potential energy between the two capacitor electrodes is given by the equation $$\Delta V = -\int E \cdot ds$$

where E is the electric field, and ds the line element between the charge and the field source. For the sake of energy harvesting the sign of the energy change is unimportant, however, what is relevant is that the system gains potential energy within an electric field and loses its potential energy in the form of current.

If there is no conductive path between the electrodes of the parallel plate capacitor, as in FIG. 2A, the charges cannot move closer to each other then the distance between the electrodes and the charges of the system have a constant potential difference between them. On a more practical level, these charges, separated by a distance, will also correspond to a capacitance. The capacitance is proportional to the amount of charge and the distance between opposite charges. As the distance between the electrodes (charges) changes, the capacitance (and potential energy) of the system will change.

Figure 2B:
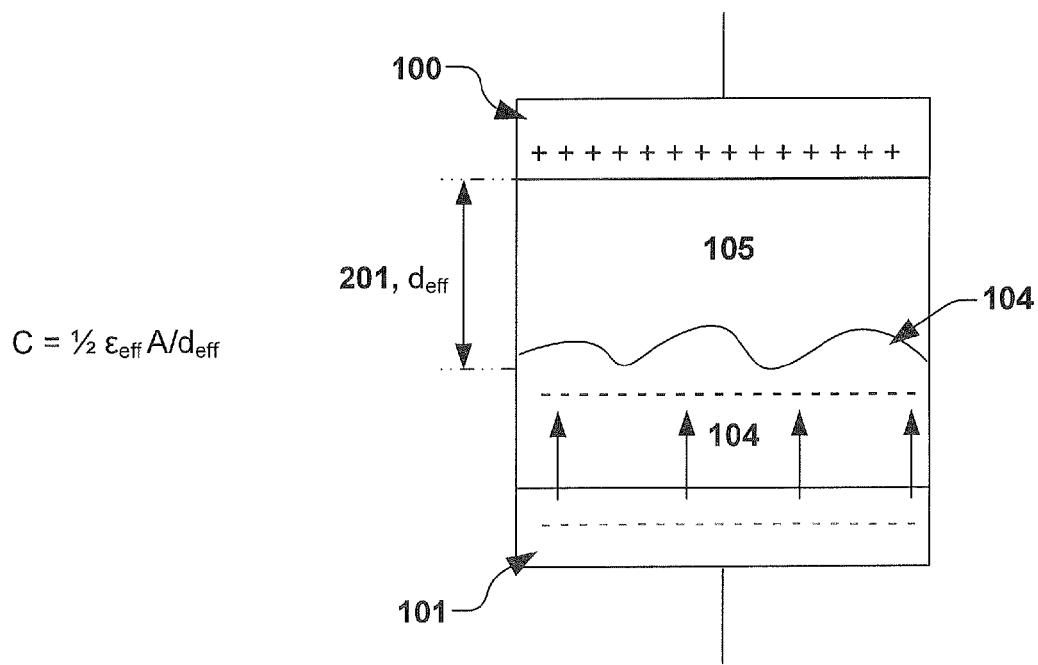
FIG. 2B shows the electrodes of a parallel plate capacitor with a conductive material between the plates and the effective distance between plates with charges included.

Referring now to FIG. 2B, the parallel plate capacitor of FIG. 2A is shown with a conductive fluid 104 between the electrodes 100 and 101. The conductive fluid 104 is in contact with the bottom electrode 101, thus forming a conductive path by which charges can move. Coulomb's law tells us that electrical charges of opposite polarity will be attracted toward each other by a force inversely proportional to the distance separating the charges. Therefore, since the charges now have a conducting path by which they can get closer, they will. Essentially, this means the bottom electrode 101 now includes the fluid 104 and therefore the bottom electrode 101 effectively moves closer to the top conductive electrode 100. The effective distance between the top electrode 100 and the bottom electrode 101 and 104 is reduced to 201 from 200, changing the capacitance (and energy) of the system. For simplicity's sake, for the rest of this detailed description, the conductive electrode will comprise the solid material electrode 101 and conductive fluid 104 if it is in contact with the electrode. Since the capacitor can be easily integrated into a circuit, it is a simple step to harvest such a change in capacitance (energy) as described above.

Since fluids are a viscous substance, in reality the distance between electrodes of such a system as FIG. 1A would be easily changed. Mechanical energy from outside of the system will be applied to move the entire system. This will result in a change of the fluid (and charges) changing its position relative to the electrodes and thus changing the device capacitance (energy). In this way mechanical energy of motion is converted to electrical energy.

The design of the variable capacitor of FIG. 1A is elegant in that it does not require any moving structural parts. This leads to a number of advantages over more complicated designs, including easier fabrication and high reliability. These advantages are especially evident when compared to existing energy harvesting technology such as a piezoelectric or an inertial based system. Piezoelectric based systems, while simple in geometry, rely upon constant stressing of the material to generate a charge. This constant stressing can lead to stress fractures within the material. Inertial based systems are much more complicated and difficult to fabricate. They also have increased risk due to wear and tear of moving parts. The simple geometry and easy fabrication of the disclosed variable capacitor allow for applications in MEMs and such alternatives are contemplated as falling within the scope of the invention.

Figure 1B:
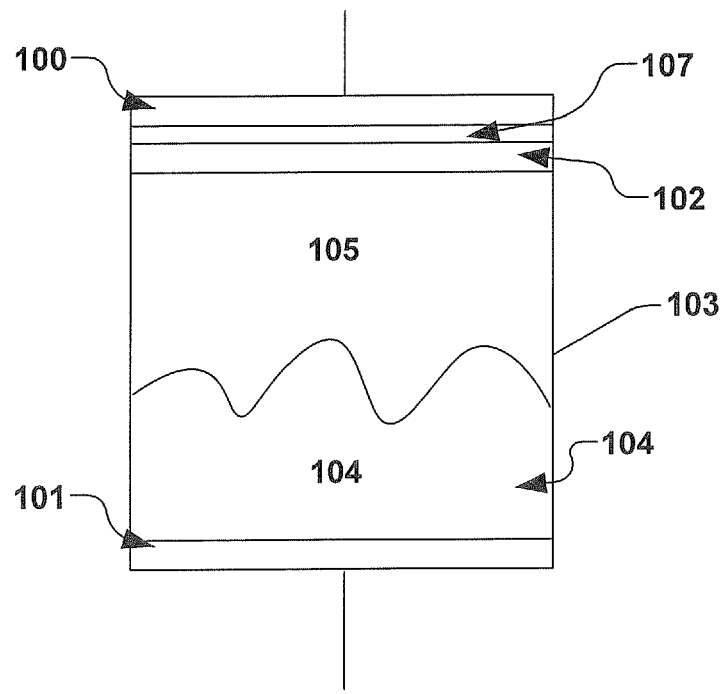
FIG. 1B shows the variable capacitor of FIG. 1A with the addition of an electret material placed between the electrodes.

FIG. 1B shows an additional embodiment of the basic structure of the variable capacitor. This embodiment comprises an electret material 107 between one of the electrodes 100 and the insulating layer 102. The conductive fluid 104 contained within the enclosed chamber 103 is also shown. While the embodiment of FIG. 1B shows the electret material 107 between the insulating layer 102 and the electrode 100, the electret material 107 can be placed anywhere between the electrodes 100 and 101, without compromising the functionality of the device. Such alternatives are contemplated as falling with the scope of the invention. The electret 107 is added as a way to generate an initial charge onto the variable capacitor. In one embodiment, it could be used as an alternative to initially charging the variable capacitor with an external power source.

Figure 3A:
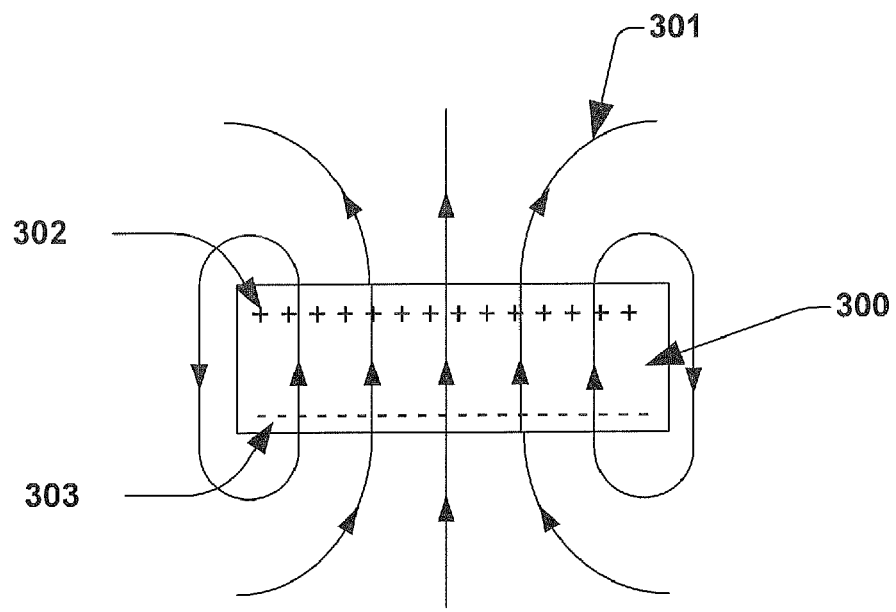
FIG. 3A shows an electret material with charges and electric field lines.

Electret materials are materials that have a quasi-permanent electric field. They are the electric equivalent of a permanent magnet. FIG. 3A shows an electret material 300 with charges 302 and 303 and electric field lines 301. These materials can be produced in a number of ways, but the basic idea is to subject a dielectric material to a strong electric field in the presence of heat or light. Upon cooling, the dipoles of the material will align and the material will retain an electric field. The longer the exposure and the stronger the field the greater the polarization of the electret material will be. The first foil electret material was made of metallized Teflon, but a wide variety of materials are currently being researched for their potential as electret materials including ceramics, polymers, etc. Any such electret material may be employed in conjunction with the invention.

Figure 3B:
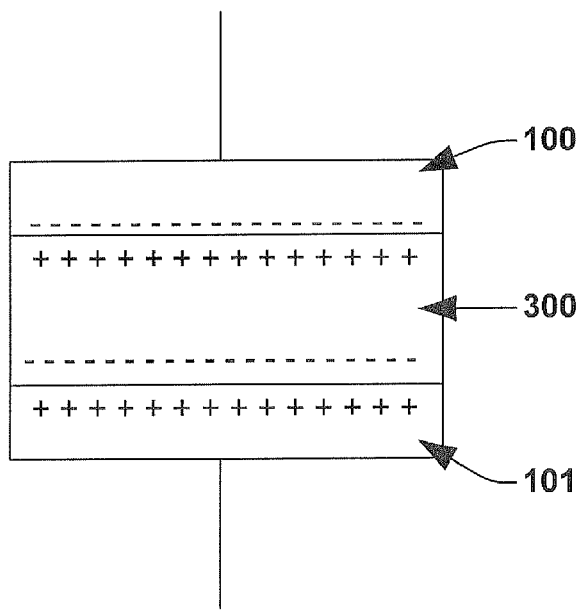
FIG. 3B shows an electret material as part of a parallel plate capacitor with charges and electric field lines.

FIG. 3B shows the electret material 300 of FIG. 3A added between the electrodes 100 and 101 of a simple parallel plate capacitor. This figure is added to show the effect an electret material 300 has when added between the electrodes of a capacitor. Positive and negative charges are shown in the figure. The fixed field of the electret material will draw the negative charges of the capacitor to the top electrode 100 and the positive charges of the capacitor to the bottom electrode 101. This creates an initial charge imbalance between the electrodes of the capacitor in the same way that an external power sources would.

In an additional embodiment of the invention, the electret material could be used as the insulating material. In such an embodiment the electret material would retain the same position within the device, between the electrodes.

Figure 4A:
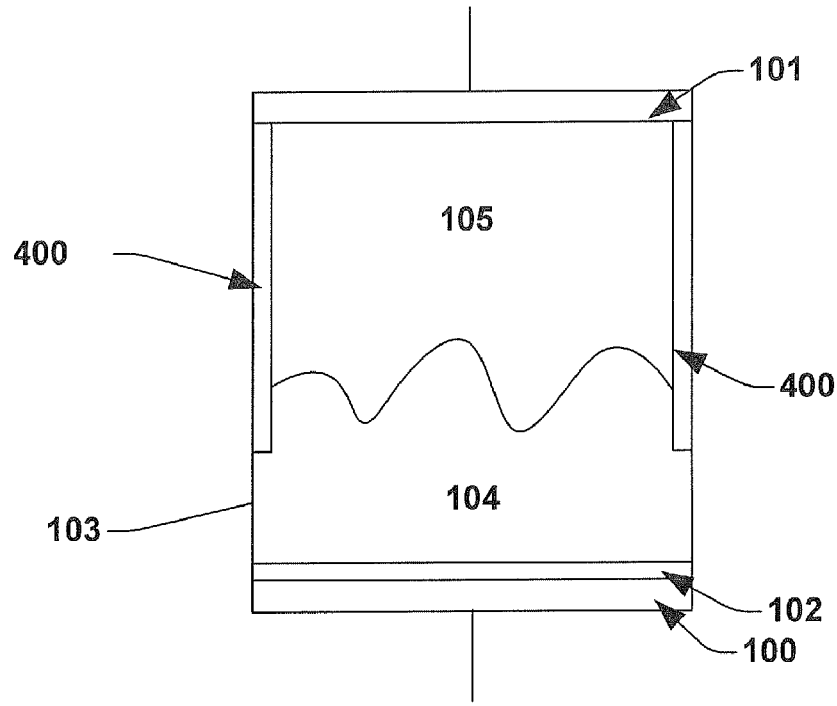
FIG. 4A shows the variable capacitor of FIG. 1B with the addition of conductive material along the walls of the enclosed chamber.

FIG. 4A shows another embodiment of the variable capacitor of FIG. 1B. In FIG. 4A an additional conductive material 400 is added along the inside walls of the enclosed chamber 103. Alternatively, the walls of the enclosed chamber 103 can be made from the conductive material, so long as no conducting path exist between the electrodes 100 and 101 (e.g., an insulating layer 102 is between the electrodes 100 and 101 from each other). This additional conductive material 400 is electrically connected to an electrode 101 in contact with the enclosed chamber 103. It is added to ensure contact between the conductive fluid 104 and the electrode 100 as the device undergoes mechanic motion. Without conductive material 400 extending into the enclosed chamber 103 electrical contact, in some cases, can be lost between the electrode 100 and the conductive fluid 104 as the device rotates or vibrates. This conductive material 400 can be, but is not limited to, the same material as the electrodes 100 and 101 of the variable capacitor.

Figure 4B:
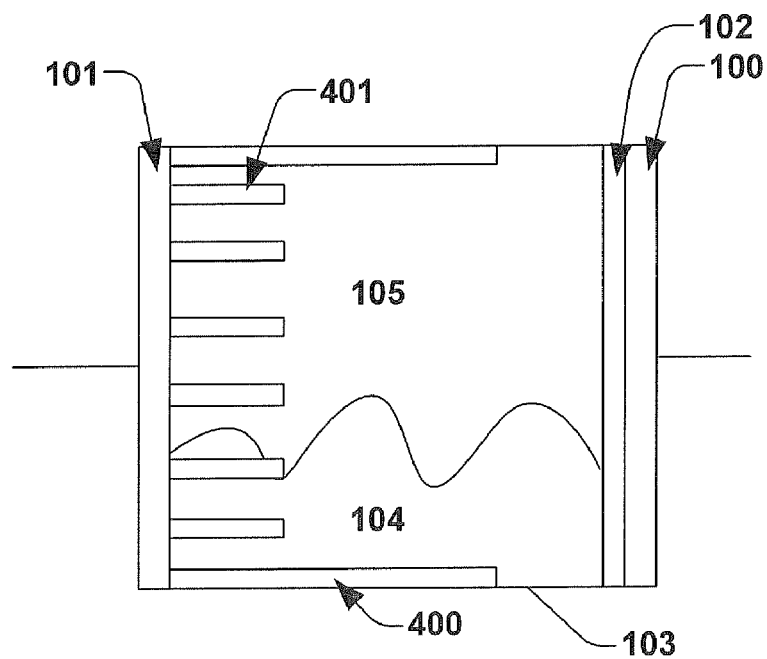
FIG. 4B shows the variable capacitor of FIG. 2A with additional posts of conductive material normal to an electrode.

FIG. 4B shows the device of FIG. 4A, in one embodiment, with additional posts 401 of conductive material normal to the electrode in contact with the fluidic chamber and with the additional posts 401 extending substantially into the enclosed chamber 103 for better electrical contact with the conducting fluid 104. The posts 401 can extend for any distance into the enclosed chamber 103 but they do not extend through the insulating layer 102 so as to create a conductive path between the electrodes 100 and 101 of the variable capacitor. Insufficient extension of the posts 401 may lead to loss of contact between the conductive fluid 104 and electrode 101. These posts 401 can be used separate from, or in conjunction with, the conductive material 400 on the sidewalls. If used separately, they will serve the same purpose as the conductive sidewalls 400, to ensure contact between the electrode 101 and the conductive fluid 104. The resistance between conductive posts 401 and conductive fluid 104 will be a function of the surface area of the conductive posts 401 in contact with the conductive fluid 104. To reduce such resistance, a large number of posts can be used in one embodiment. If the posts 401 are used in conjunction with the conductive sidewalls 400, the posts 401 serve to increase the contact between the conductive fluid 104 and electrodes 101 and therefore further decrease the resistance between the conductive fluid 104 and the electrodes 101. These posts of conductive material can be, but are not limited to, the same material as the electrodes or sidewalls of the device.

FIG. 5A-5C show an example of how the capacitance of the system changes as the device rotates. For this example capacitance will be calculated through use of the equation $$C = \tfrac{1}{2} \in_{eff} A/d$$

where A is the area of the conductive plates and d is the effective distance between the electrodes 100 and 101. The distance between the electrodes 100 and 101 changes as the fluid 104 within the device moves. FIG. 5A shows the device at a 0 degree rotation, FIG. 5B at a 90 degree rotation, and FIG. 5C at a 180 degree rotation. The capacitance will be dependent upon a number of factors in addition to the position of the fluid, including the effective dielectric constant of the materials inside of the chamber 103 and the amount of fluid added to the variable capacitor. For simplicity sake it will assumed that the chamber 103 has a length and width of "a" (FIG. 5A-5C show a cross section of the device such that a would equal twice the value of 504) and that the combined thickness of the insulating 102 and electret material of "δ" (FIG. 5A-5C show only an insulating layer, it can be assumed that the device is externally biased). It will also be assumed that the volume of the conductive fluid 104 in the enclosed chamber 103 is half the volume of the chamber. For FIG. 5A the effective distance 500 between electrodes 100 and 101 is $a/2+\delta$ and the area of the electrodes is $a^2$. This gives a capacitance of $\in_{eff} a^2/(a+2\delta)$. In FIG. 5B the system is rotated by 90 degrees and the conductive fluid has shifted its position. In this situation the capacitance of the system is a combination of the capacitance due to the effective distances 501 and 502, but since δ<<a and the capacitance increases as the inverse of the distance, the contribution of the effective distance 502 can be ignored since the contribution due to 501 will dominate. Taking this into consideration, the area of the electrodes will be $a^2/2$ and the distance 501 between electrodes 100 and 101, is δ. This gives a total capacitance of approximately $\in_{eff} a^2/4\delta$. In FIG. 5C the system is again rotated by 90 degree with respect to FIG. 5B and the conductive fluid has shifted position again. The area of the electrodes will be $a^2$ and the effective distance 503 between electrodes 100 and 101, is δ. This gives a total capacitance of approximately $\in_{eff} a^2/2\delta$. From this example it can be seen that as the device rotates the capacitance changes from $\in_{eff} a^2/(a+2\delta)$ at a 0 degree rotation, to about $\in_{eff} a^2/4\delta$ at a 90 degree rotation, and to about $\in_{eff} a^2/2\delta$ at a 180 degree rotation. Mechanical vibrations will similarly change the position of the fluid relative to the electrodes, therefore also changing the capacitance of the device with external motion.

Figure 6:
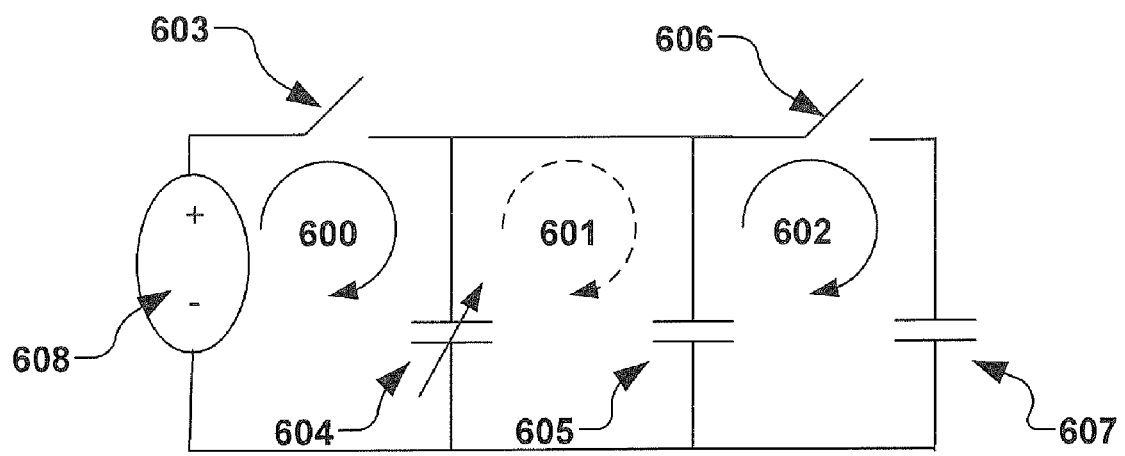
FIG. 6 shows an example of an energy harvesting system circuit.

FIG. 6 shows an example of an energy harvesting circuit within which the variable capacitor of this disclosure can be employed. This system comprises two separate circuit loops 600 and 602. There is also a center "loop" 601, but this loop only has a variable capacitor 604 and a parasitic capacitor 605 added to correctly account for the parasitic capacitance of the circuit and can be counted as a single capacitor for practical purposes. The left loop 600 has a voltage source 608, a first switch 603, and the variable capacitor 604. The variable capacitor 604 is the device by which energy is converted from mechanical energy to electrical energy through a change in the position of the conductive fluid within the capacitor. This loop 600 acts to initially charge the capacitor through use of the voltage source 608. When the variable capacitor 604 is charged the switch 603 can be opened and loop 600 is disconnected. If an embodiment of the invention using an electret material is employed, this loop 600 is unnecessary as the charging of the variable capacitor 604 is done through the electret material.

The right most loop 602 of the circuit has the variable capacitor 604, a second switch 606, and a storage capacitor 607. This loop 602 is used to store energy from the variable capacitor 604 in the storage capacitor 607 and therefore to save converted mechanical energy as electrical energy. The energy the device is able to harvest is dependent upon the size of the enclosed chamber, the dielectric constant of the conductive material in the chamber, and the amount of material in the chamber.

An exemplary operation of the circuit of FIG. 6 comprises three phases: a pre-charge phase, a harvesting phase, and a recovery phase. For variable capacitors not comprising an electret layer, operation of the energy harvesting circuit begins with a pre-charge phase. The pre-charge phase begins when the capacitor plates are at a minimum spacing. The first switch 603 is closed and the second switch 606 is open. The closure of the first switch 603 connects the voltage source 608 to the variable capacitor 604. The voltage source will cause a potential difference across the variable capacitor 604 to equal the potential difference of the voltage source. For variable capacitors comprising an electret layer the potential difference is provided by the electret layer and connection to the voltage source 608 is not necessary. Once the capacitor has reached the potential difference of the voltage source/electret, the harvesting phase begins. As the energy harvesting system 609 undergoes physical motion, the capacitance of the variable capacitor 604 will change as described above. Through motion, the capacitance will decrease. Since the voltage is held constant by the voltage source 608, the change in capacitance of the variable capacitor 604 drives charge into the discharge capacitor 607. When the variable capacitor 604 reaches a minimum capacitance value the switches, 603 and 606, are opened. Subsequent physical motion returns the variable capacitor plates to their minimum space. The return to minimum space causes a drop in the voltage as the charge is held constant in the isolated capacitor.

Figure 7A:
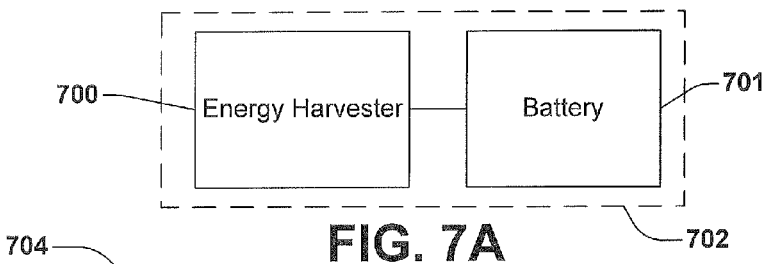
FIG. 7A shows an example of a battery system containing an energy harvester.

FIG. 7A shows the application of an energy harvesting system 700 as a means to charge a battery 701 according to one embodiment. In this figure the energy harvesting system 700 comprises the variable capacitor and through conversion of mechanical energy to electric energy, will charge the battery 701. Through use of a battery 701 to store the harvested energy, the energy harvesting system 700 can be applied to a wide range of applications.

Figure 7B:
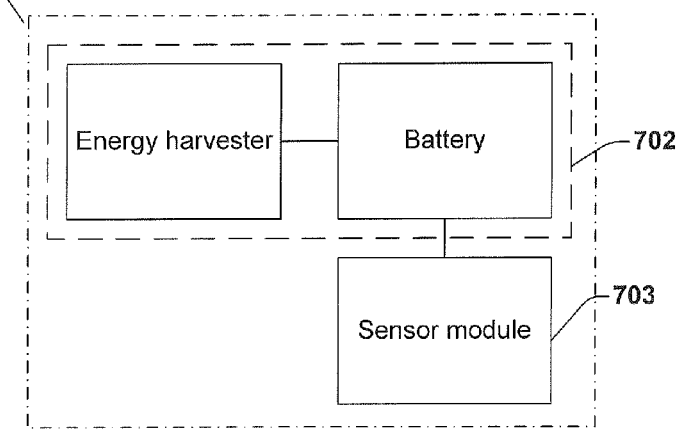
FIG. 7B shows an example of a tire sensor system containing an energy harvester.

FIG. 7B shows the battery system 702 of FIG. 7A 702 attached to a sensor module 703. In one embodiment, the battery system 702 and sensor module 703 would both be attached to a tire. The sensor module 703 is configured to acquire one or more tire parameters (e.g., a tire pressure). The use of the disclosed variable capacitor as a part of this system would be advantageous due to the nature of the motion of the tires, as the example of FIGS. 5A-5C showed. That is, as the tire rotates the energy harvester 700 is rotated, thus charging a local charge store associated with the sensor module 703. The local charge store is then used to power the sensor module 703, thereby avoiding battery replacement.

Figure 7C:
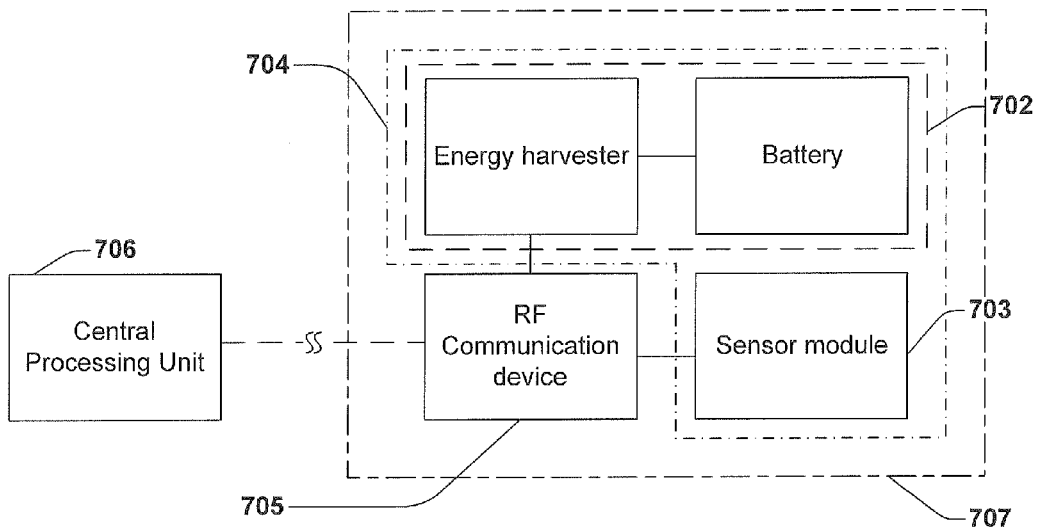
FIG. 7C shows an example of a tire monitoring system containing an energy harvester.

FIG. 7C shows the tire sensor system 704 of FIG. 7B integrated into a tire monitoring system 707. The energy harvesting and battery component 702 of FIG. 7B is now additionally used to power a small RF communication device 705 (e.g., transmitter, transceiver). In this embodiment the sensors 703, battery system 702, and communication device 705 are attached to each tire of the vehicle. The communication device 705 relays tire sensor readings taken by the tire sensor module 703 to a central processing unit 706 that monitors systems within the car and notifies the driver when sensor readings are outside of a predetermined limit. In one embodiment the central processing unit is located within the car. In another embodiment the sensor module relays data to a central processing unit remotely located from the automobile and the results of the data are communicated to the automobile wirelessly (e.g., through a mobile phone network).

Figure 8:
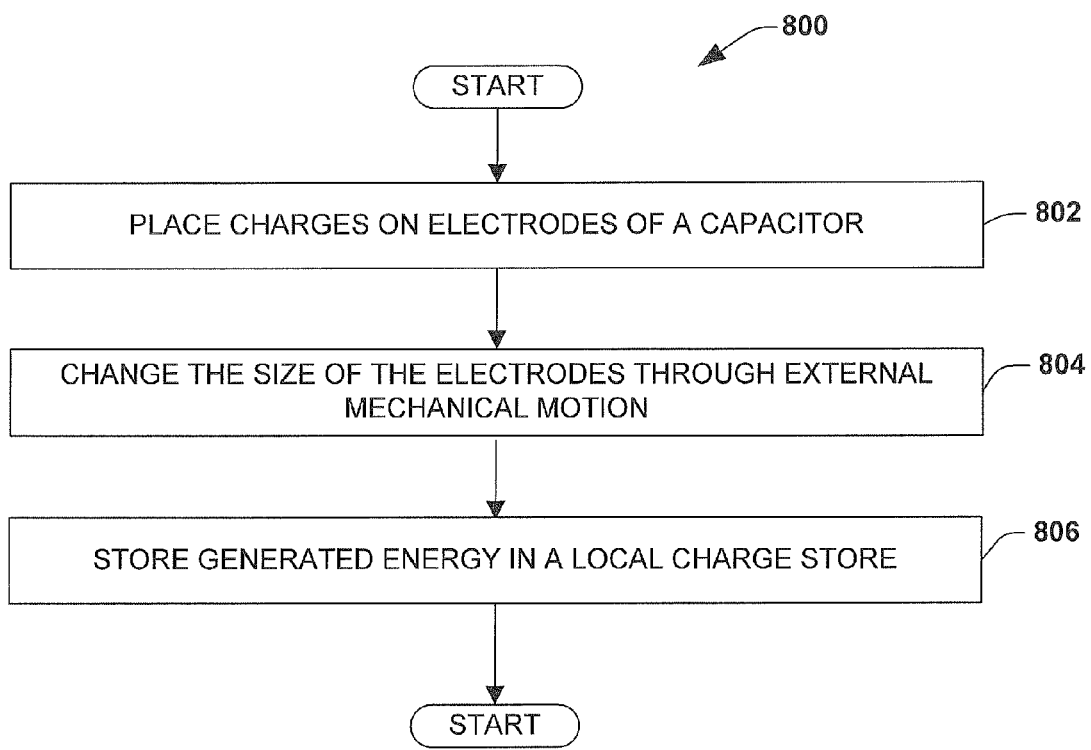
FIG. 8 shows an exemplary methodology by which mechanical energy is converted to electrical energy.

FIG. 8 shows an exemplary methodology 800 by which mechanical energy is converted to electrical energy. While the method 800 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Further, one or more of the acts depicted herein may be carried out in one or more separate acts and/or phases.

The method 800 starts by placing electrical charges on the electrodes of a capacitor at 802. In one embodiment such a capacitor could have two electrodes, while in other embodiments the variable capacitor could comprise additional electrodes. Charges are placed on the electrodes of the variable capacitor at 802. For example, charges can be placed by inclusion of an electret material in the device or through attaching the device to an external power source. Other alternatives for placing charges onto the electrodes have also been contemplated by the inventor.

At 804, an external force acting on the device changes the size of the electrodes. The external force can be, but is not limited to, rotation of the device, vibration of the device, or linear acceleration of the device. In one embodiment the size is changed by enclosing a conductive material within the device such that the conductive material will change its position relative to the electrodes as the device undergoes external motion. Other alternatives have also been contemplated by the inventor for methods by which the size of the electrodes may be changes. As the electrodes change size, the capacitance of the device will change accordingly.

The capacitance change will drive charges from the variable capacitor which can then be stored in a local charge store. In one embodiment the local charge store could be a storage capacitor. In a different embodiment the local charge store could be a chemical battery. The storage of generated energy is not limited to these embodiments and can by achieved through other additional means.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A tire sensor system, comprising:
a variable capacitor comprising two electrically conductive electrodes, wherein at least one electrode is adapted to change size as the capacitor undergoes physical motion, thereby resulting in a change of capacitance;
an energy storage circuit configured to utilize the change in capacitance to store electrical energy;
a tire sensor module configured to use the stored electrical energy; and
a mount apparatus configured to mount the variable capacitor and sensor module onto a tire such that the variable capacitor will undergo physical motion as the tire moves.

2. The tire sensor system of claim 1, further comprising a battery coupled to the energy storage circuit and the tire sensor module.

3. The tire sensor system of claim 2, further comprising a transmitter or transceiver, coupled to the battery and the tire sensor module, configured to wirelessly transmit data.

4. The tire sensor system of claim 3, further comprising a central processing unit configured to receive the data from the transmitter or transceiver.

5. The tire sensor system of claim 1, further comprising one or more electrically conductive posts electrically coupled to and normal to one of the electrodes.

6. The tire sensor system of claim 5, wherein the conductive post and the conductive inside walls comprise the same conductive material.

7. A method for converting mechanical energy to electrical energy, comprising:
placing charges on two electrodes of a variable capacitor, wherein the charges are placed on the electrodes of the variable capacitor by including an electret material between the electrodes;
generating an electrical energy through changing the location of the charges on the electrodes by changing the size of at least one electrode; and
storing the generated electrical energy.

8. The method of claim 7, wherein the size of the electrodes is changed by rotating the variable capacitor or vibrating the variable capacitor.

9. The method of claim 7, wherein the charges are placed on the electrodes of the variable capacitor by connecting the electrodes to a voltage source.

10. The method of claim 7, wherein the resultant energy is stored in a local charge store.

11. A method for converting mechanical energy to electrical energy, comprising:
placing charges on two electrodes of a variable capacitor;
generating an electrical energy through changing the location of the charges on the electrodes by changing the size of at least one electrode as the capacitor undergoes physical motion, thereby resulting in a change of capacitance;
storing the generated electrical energy and the variable capacitor in a tire sensor module configured to use the electrical energy; and
configuring the tire sensor module to facilitate a mounting of the tire sensor module onto a tire such that the variable capacitor will undergo physical motion as the tire moves.

* * * * *